United States Patent
McAllister

(10) Patent No.: US 6,695,090 B2
(45) Date of Patent: Feb. 24, 2004

(54) BACK-LIT HANDLEBAR CONTROL ASSEMBLY

(75) Inventor: Michael C. McAllister, Blaine, MN (US)

(73) Assignee: Motorcycle Riders Holdings Corp., Burnsville, MN (US)

( * ) Notice: Subject to any disclaimer, the term of this patent is extended or adjusted under 35 U.S.C. 154(b) by 0 days.

(21) Appl. No.: 09/784,528

(22) Filed: Feb. 15, 2001

(65) Prior Publication Data

US 2002/0108801 A1 Aug. 15, 2002

(51) Int. Cl.[7] .............................. B60K 26/00; H01H 9/00
(52) U.S. Cl. .................. 180/333; 74/488; 200/310; 200/314
(58) Field of Search .................... 180/315, 332, 180/333; 200/61.85, 310, 313, 314; 74/484 R, 488; 477/172

(56) References Cited

U.S. PATENT DOCUMENTS

| | | | |
|---|---|---|---|
| 3,805,003 A | * 4/1974 | Rennels | 200/61.85 |
| 4,191,866 A | * 3/1980 | Nakajima et al. | 200/61.85 |
| 4,213,513 A | * 7/1980 | Beck | 200/61.85 |
| 4,455,463 A | * 6/1984 | Rohl | 200/61.85 |
| 4,475,015 A | * 10/1984 | Kobayashi et al. | 200/61.85 |
| 4,508,944 A | * 4/1985 | Yashima et al. | 200/61.85 |
| 4,565,909 A | * 1/1986 | Yashima et al. | 200/61.85 |
| 4,630,160 A | * 12/1986 | Murayama | 360/137 |
| 4,641,723 A | * 2/1987 | Takanashi et al. | 180/332 |
| 4,847,454 A | * 7/1989 | Hiruma | 200/61.85 |
| 4,932,913 A | * 6/1990 | Raviv et al. | 446/406 |
| 5,532,674 A | * 7/1996 | Michaud | 340/479 |
| 5,703,625 A | * 12/1997 | Snider et al. | 345/102 |
| 6,040,763 A | * 3/2000 | Nakajima | 340/426 |
| 6,113,243 A | * 9/2000 | Saul | 362/105 |
| 6,135,227 A | * 10/2000 | Laning | 180/170 |
| 6,157,890 A | * 12/2000 | Nakai et al. | 701/208 |
| 6,167,774 B1 | * 1/2001 | Gagnon et al. | 200/61.85 |
| 6,204,752 B1 | * 3/2001 | Kishimoto | 340/432 |
| 6,225,584 B1 | * 5/2001 | Ase et al. | 200/61.85 |
| 6,286,972 B1 | * 9/2001 | Shepherd et al. | 362/86 |

FOREIGN PATENT DOCUMENTS

| | | | |
|---|---|---|---|
| JP | 516866 | * 1/1993 | 200/61.85 |
| JP | 6144325 | * 5/1994 | 200/61.85 |
| JP | 11321759 | * 11/1999 | 200/61.85 |

* cited by examiner

Primary Examiner—Paul N. Dickson
Assistant Examiner—Toan C To
(74) Attorney, Agent, or Firm—Gerald E. Helget; Nelson R. Capes; Briggs and Morgan

(57) ABSTRACT

A back-lit handlebar control assembly for vehicles steered by a handlebar includes a front control housing and a rear control housing that are joined together at each end of the handlebars where an operator typically would grip. The control housing includes back-lit control buttons with indicia thereon partially passing through the front portion of the control housing for easy access and nighttime vision by the operator.

22 Claims, 3 Drawing Sheets

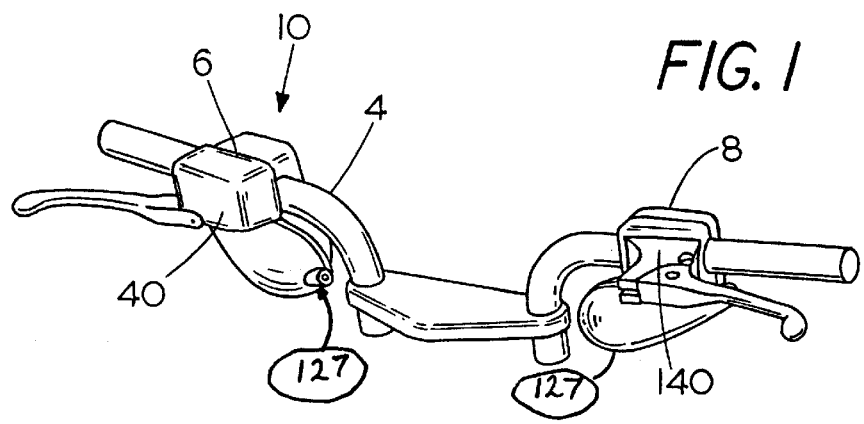
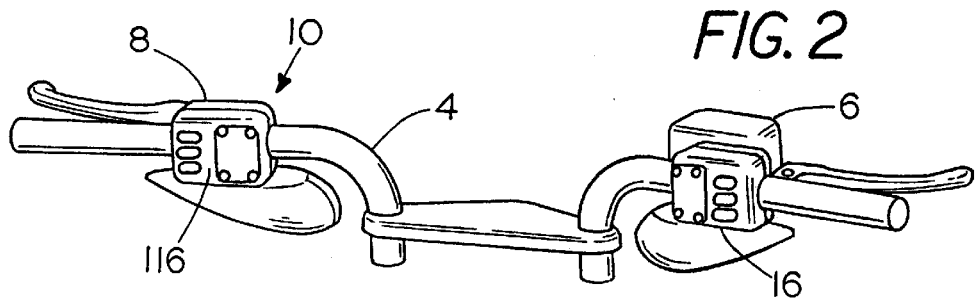
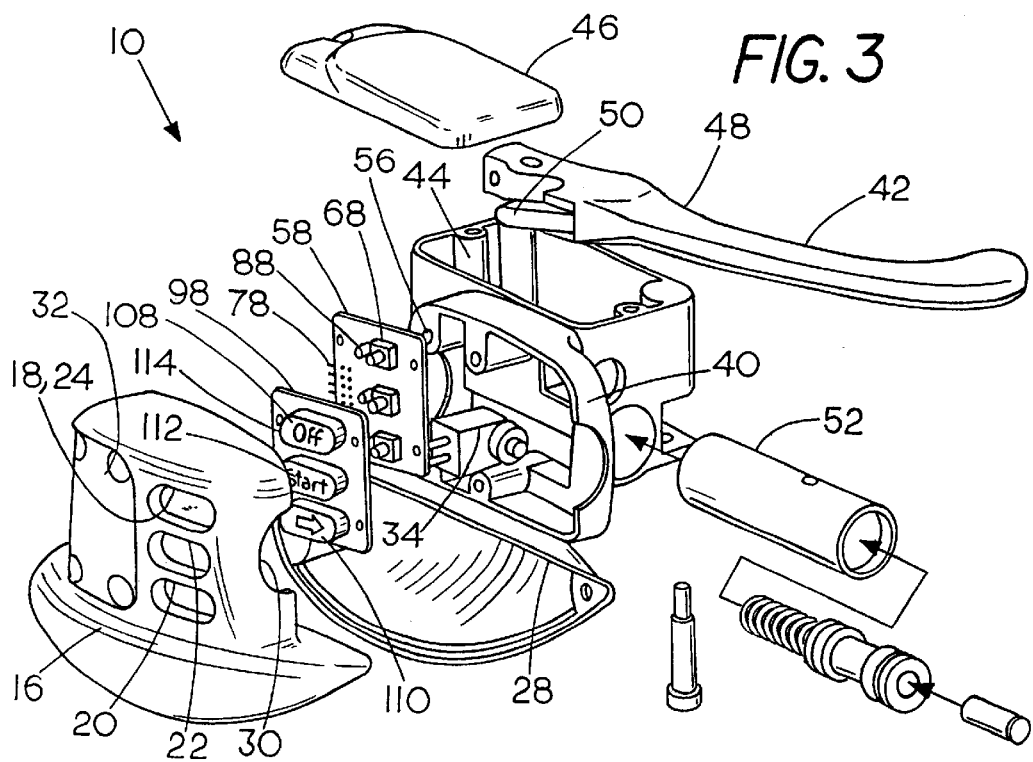

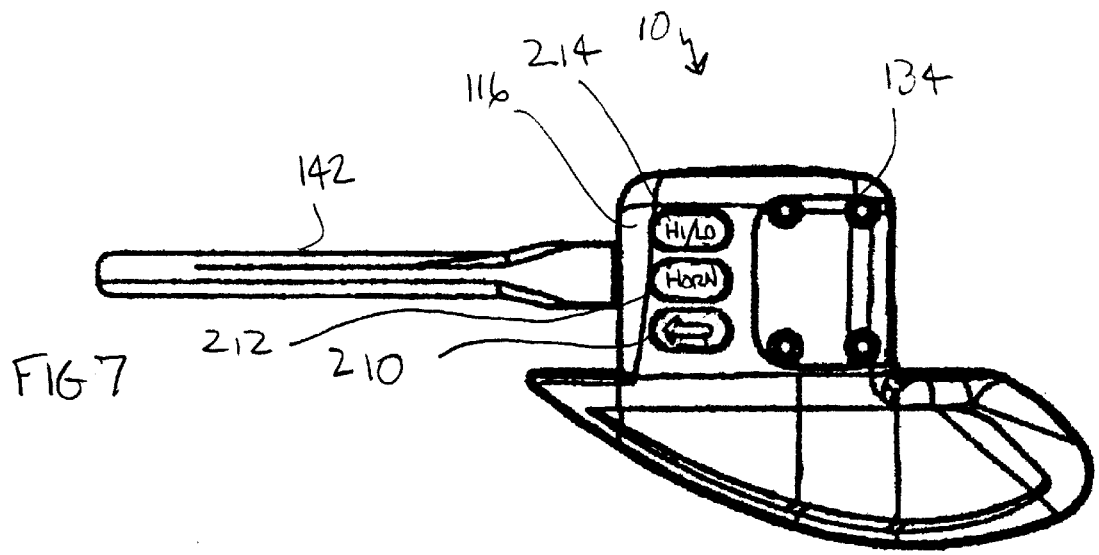
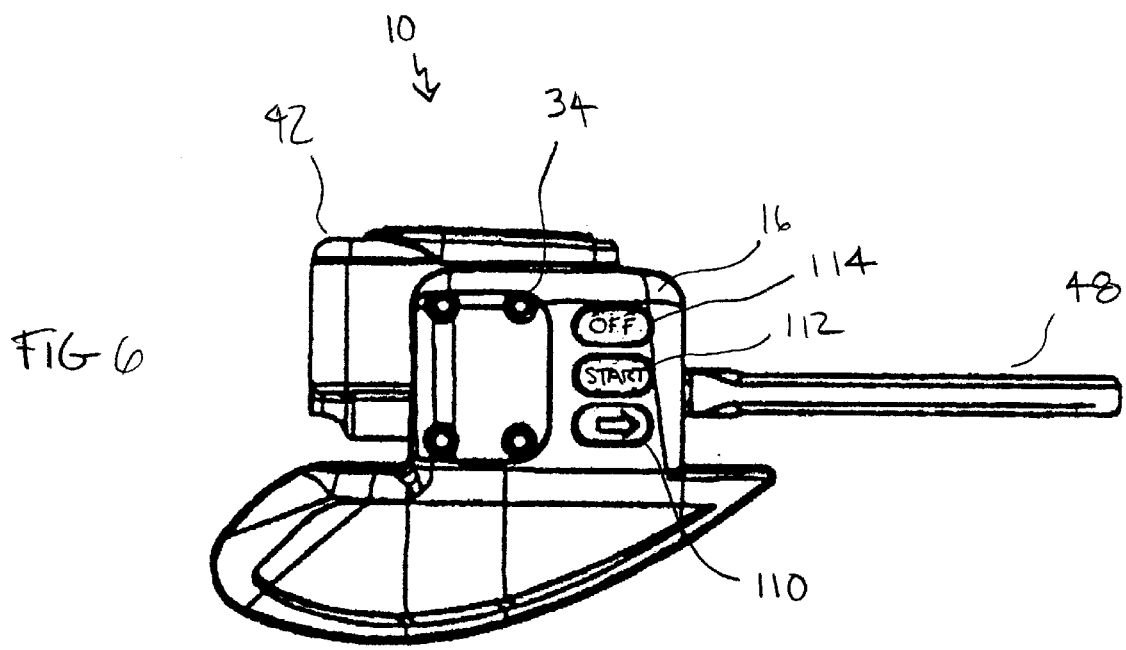

US 6,695,090 B2

BACK-LIT HANDLEBAR CONTROL ASSEMBLY

BACKGROUND OF THE INVENTION

This invention generally relates to a back-lit control assembly and more particularly to a back-lit handlebar control assembly for use with vehicles such as motorcycles, ATVs, snowmobiles, golf carts and the like. The operation and control of such vehicles would be facilitated by the control buttons being illuminated.

It is well known that automobiles have advanced significantly in their controls and operation to facilitate the operator's control over the vehicle. For instance, the dashboards of automobiles and trucks have become computerized with information stations and back-lit gauges. Nonetheless, what controls remain manual are generally easily located by the operator as the operator does not require any balance or exerted physical attention during operation of the vehicle while comfortably seated within the automobile or truck.

In contrast, motorcycles, snowmobiles, all-terrain vehicles, golf carts and the like have not significantly advanced in their control operation. These recreational vehicles require significant concentration on behalf of the operator to prevent an accident. That is, balance and concentration while maintaining control of the vehicle and operating the motorcycle or the like by gripping the handlebars, is significantly more complicated than operating an automobile or a truck. These types of vehicles are steered by handlebars which include buttons and switches near the gripping region of the handlebars for controlling the starting of the vehicle, turning the vehicle off, operating left and right blinkers, high and low beam headlights and a warning horn or siren.

Operation of handlebar driven vehicles requires training, balance and, in many jurisdictions, certification. The operation of these types of vehicles requires balance as well as skill in less than straight flat terrain. When operating these types of vehicles in low light or at night, the operator is often confused as to the location of the control buttons unless significant training and commitment to memory as to the control button location has been previously achieved.

There is a need for a back-lit handlebar control assembly for an operator to use on handlebar operated vehicles having not previously committed to memory the specific location of the various control buttons. In other words, the individual control buttons are illuminated with their indicia of operation to facilitate the operator as to the particular location of the button. Thus, while the operator is driving the vehicle and concentrating on balance and steering, the operator merely would only need to instantaneously look down to the handlebar control assembly with back-lit control buttons to determine the location of the particular control button for the operational condition.

SUMMARY OF THE INVENTION

A back-lit handlebar control assembly for vehicles steered by a handlebar includes a front control housing and a rear control housing that are joined together at each end of the handlebars where an operator typically would grip. The control housing includes back-lit control buttons with indicia thereon partially passing through the front portion of the control housing for easy access and nighttime vision by the operator.

A principal object and advantage of the present invention is that handlebar driven vehicles do not require the operator to memorize the location of each particular control button now that they may be back-lit with indicia thereon for quick reference and operation.

Another object and advantage of the present invention is that a novice handlebar vehicle operator may continue to concentrate on balance and operation without carelessly pressing the wrong button during startup, operation and turning off the vehicle due to the visible back-lit indicia on the control assembly buttons.

Other objects and advantages will become apparent upon a viewing of the attached figures, a study of the specification, and a reading of the appended claims.

BRIEF DESCRIPTION OF THE DRAWINGS

FIG. 1 is a front perspective view of the handlebar assembly of a typical handlebar controlled vehicle;

FIG. 2 is a rear perspective view of the handlebar assembly;

FIG. 3 is an exploded assembly view of the back-lit handlebar control assembly of the present invention for the brake side of the handlebars;

FIG. 6 is a front elevational view of the brake side of the back-lit handlebar control assembly; and FIG. 7 is a front elevational view of the clutch side of the back-lit handlebar control assembly.

DETAILED DESCRIPTION OF THE PREFERRED EMBODIMENTS

Figure 4:
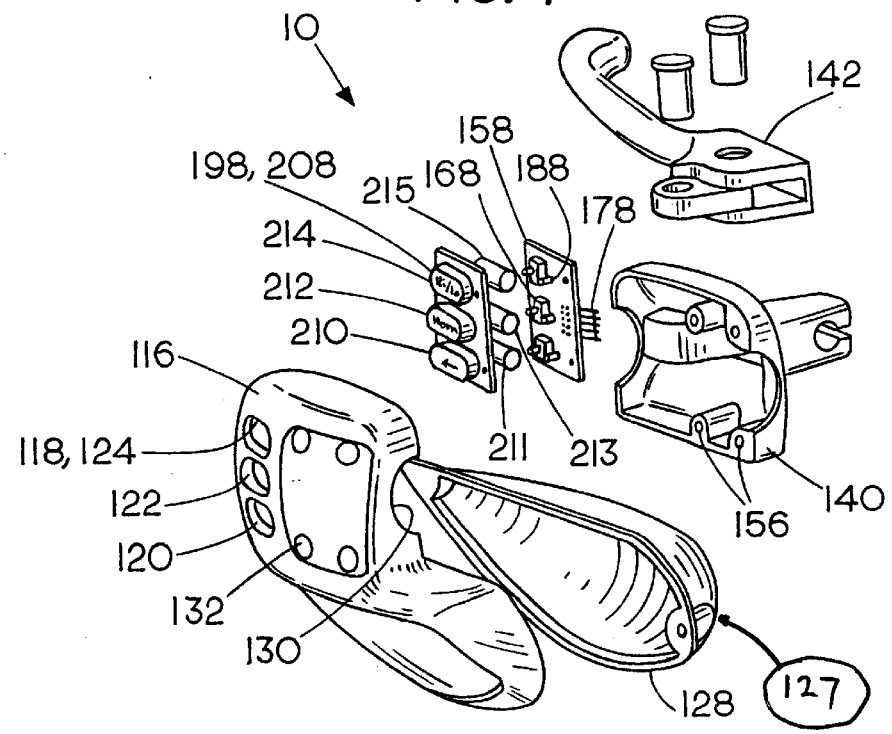
FIG. 4 is a front perspective view of the back-lit handlebar control assembly for the clutch side of the handlebars.

Referring to FIGS. 1 and 2, handlebar 4 is shown which is typically the steering and handling mechanism for motorcycles, all-terrain vehicles (ATVs), snowmobiles, and golf carts. The handlebar 4 is typically comprised of a brake and throttle side assembly 6 and a clutch side assembly 8.

Referring to FIGS. 3 through 6, the back-lit handlebar control assembly 10 may be appreciated. First referring to the brake side of what would be handlebar 4, the present invention comprises brake side front control housing 16 which may be molded, cast or otherwise machined out of metal, composite or high impact plastic. The brake side front control housing 16 has control button access passages, cut-outs or holes 18. The passages typically are right blinker button passage 20, engine start button passage 22 and engine off button passage 24. On the inside of housing 16 (shown as 126 in FIG. 5) is located a blinker bulb bracket which supports a bulb for blinker lights which is enclosed by lens 28.

The brake side front control housing 16 typically has a handlebar cut out 30 with screw apertures 32 for receiving screws 34, which will be appreciated. The brake side rear control housing 40 similarly may be constructed as the front housing 16 while the two housings 40 and 16 may be unitary and slid over handlebars 40 and secured thereat by conventional means, such as set screws appreciated by one skilled in the art. The brake side rear control housing 40 has a brake master cylinder assembly 42 including a fluid reservoir 44, cap 46, brake lever 48 with actuator tip 50, piston cylinder assembly 52 and brake switch 54. Threaded apertures 56 are located internal of the rear housing 40 to receive screws 34 passing through front housing apertures 32 to securely locate and clamp the control housings 16 and 40 about the handlebar 4 at a comfortable position for the operator.

Internal of the control housing 16 is a PCB electrical switch assembly 58, which has soldered thereon a tactile switch 68 from C&K Components, Inc., Newton, Mass. A white 3 mm LED 88 is also mounted on board 58. The LED is from SloanLED of Ventura, Calif. A Molex 10 CKT right angled header 78 permits the electrical connection between the tactile switch 68, the White LED 88, and the vehicle's twelve volt system, including lights, horn and engine system.

The back-lit assembly 98 generally includes a back-lit membrane 108 made of an elastomer with printed indicia thereon and an internal light conducting element, such as plastic or other suitable fiberoptic material, as will be appreciated in detail later herein in FIG. 4. The membrane 108 once assembled is comprised of right blinker button 110, engine start button 112, and engine off button 114, which extend through the button access passages 20, 22, and 24 respectively for easy operator access.

Figure 5:
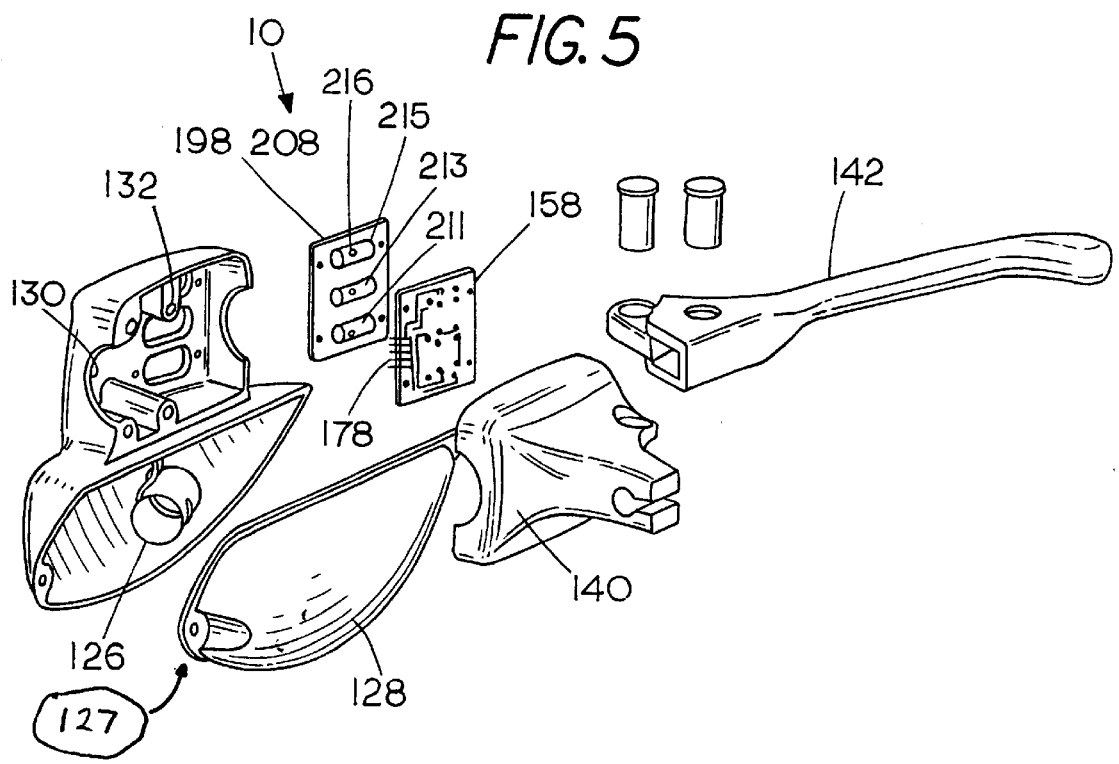
FIG. 5 is a rear exploded general assembly perspective view of the back-lit handlebar control assembly for the clutch side of a handlebar.

Referring to FIGS. 4 and 5, the clutch-side front control housing 116 of the present invention may be appreciated. Housing 116 includes control switch or button passage 122 and high/low headlight button passage 124. Here, the blinker bulb bracket 126 may be seen in FIG. 5 as well as lens 128 which refracts the blinking and driving lights of the bulb, not shown. Blinker bulb bracket 126, lens 128 and the bulb generally comprise a turn signal 127. Also, front housing 116 has handlebar cutout 130, screw apertures 132, and screws 134, which may pass therethrough and will be appreciated in FIGS. 5 and 6.

The clutch-side rear control housing 140 includes clutch assembly 142 and internally threaded apertures 156. Similarly, the rear housing has a handlebar cutout as will be appreciated by one skilled in the art to allow the front control housing 116 and rear control housing 140 to be clamped and secured to a specific location about handlebar 4 by way of screws 134 passing through screw apertures 132 and being secured in threaded apertures 156.

Similar to the brake side front control housing, internal of the clutch side is back-lit assembly 198 with the back-lit membrane 208 which is made of a light conducting synthetic or natural elastomer. The membrane is comprised of a two-shot molded product including the left blinker button 210 with light conducting element 211 secured into the protruding portion of the membrane 208 suitably at left blinker button 210 position. Horn button 212 also includes light conducting element 213 similarly positioned at its protuberance and the membrane 208. Also high/low headlight button 214 includes a light conducting element 215 situated within the protuberance of the back-lit membrane 208. All of the light conducting elements 211, 213, and 215 appropriately have an LED pocket 216 for receiving the White LED 188. Similarly, the PCB electrical switch assembly 158 includes the tactile switch 168 which engages the light conducting elements 211, 213, and 215 and the control assembly is energized by way of connection to the Molex CKT right angle header 178. Again, the White LED 188 is supported on the PCB 158.

Referring to FIGS. 5 and 6, the operation of the back-lit handlebar control assembly 10 may be appreciated. The operator turns the key on the vehicle. Upon the ignition energizing the assembly, all buttons 110, 112, 114, 210, 212, and 214 are lit up for easy recognition and location in low light conditions. The operator depresses the engine start button 112. The operator may then drive the vehicle concentrating on steering and balance without concern about memorizing the location of the particular control buttons. That is because the control buttons are illuminated with indicia thereon to assist the operator in safe operation of the vehicle.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A back-lit handlebar control assembly for vehicles steered by a handlebar, comprising:
    a) a front control housing with control button passages therethrough;
    b) back-lit control buttons with indicia thereon partially passing through the control button passages and extending from an electrical switch control assembly;
    c) a rear control housing joining the front control housing, enclosing the electrical switch assembly and securing the back-lit handlebar control assembly to the handlebar; and
    d) a turn signal connected to the handlebar control assembly activated to indicate a turn by actuation of one of the buttons.

2. The back-lit handlebar control assembly of claim 1, further comprising a brake assembly attached to the rear control housing that is connected to the handlebar control assembly engageable to slow the vehicle.

3. The back-lit handlebar control assembly of claim 1, wherein the front housing and rear housing are separately tightened together.

4. The back-lit handlebar control assembly of claim 1, wherein the buttons control starting of the vehicle, turning the vehicle off, blinkers, headlights and a horn.

5. A back-lit handlebar control assembly for vehicles steered by a handlebar, comprising:
    (a) a front control housing with control button passages therethrough;
    (b) back-lit control buttons with indicia thereon partially passing through the control button passages and extending from an electrical switch assembly, each button comprised of a back-lit elastomer over a light conducting element engageable with the switch assembly, and a light; and
    (c) a rear control housing joining the front control housing, enclosing the electrical switch assembly and securing the back-lit handlebar control assembly to the handlebar.

6. The back-lit handlebar control assembly of claim 5, further comprising a turn signal connected to the handlebar control assembly activated to indicate a turn by actuation of one of the buttons.

7. The back-lit handlebar control assembly of claim 5, further comprising a brake assembly attached to the rear control housing that is connected to the handlebar control assembly engageable to slow the vehicle.

8. The back-lit handlebar control assembly of claim 5, wherein the front housing and rear housing are separately tightened together.

9. The back-lit handlebar control assembly of claim 5, further comprising an LED light on the switch assembly to illuminate the indicia on the control buttons for button visibility in low light conditions.

10. The back-lit handlebar control assembly of claim 5, wherein the buttons control starting of the vehicle, turning the vehicle off, blinkers, headlights and a horn.

11. A back-lit handlebar control assembly for vehicles steered by a handlebar, comprising:
   (a) a front control housing with control button passages therethrough;
   (b) back-lit control buttons with indicia thereon partially passing through the control button passages and extending from an electrical switch control assembly; each button comprised of a back-lit elastomer with indicia molded over a light conducting element engageable with the switch assembly and an LED light; and
   (c) a rear control housing joining the front control housing, enclosing the electrical switch assembly and securing the back-lit handlebar control assembly to the handlebar.

12. The back-lit handlebar assembly of claim 11, further comprising a turn signal connected to the handlebar control assembly to indicate a turn by actuation of one of the buttons.

13. The back-lit handlebar control assembly of claim 11, further comprising a brake assembly attached to the rear control housing that is connected to the handlebar control assembly engageable to slow the vehicle.

14. The back-lit handlebar control assembly of claim 11, wherein the front housing and rear housing are separately tightened together.

15. The back-lit handlebar control assembly of claim 11, wherein the buttons control starting of the vehicle, turning the vehicle off, blinkers, headlights and a horn.

16. A back-lit handlebar control assembly for vehicles steered by a handlebar, comprising:
   (a) a front control housing with control button passages therethrough;
   (b) back-lit control buttons with indicia thereon partially passing through the control button passages and extending from an electrical switch control assembly; and
   (c) a rear control housing joining the front control housing, enclosing the electrical switch assembly and securing the back-lit handlebar control assembly to the handlebar, wherein the control buttons are each comprised of a back-lit elastomer with indicia molded over a light conducting element engageable with the switch assembly.

17. The back-lit handlebar control assembly of claim 16, further comprising a brake assembly attached to the rear control housing that is connected to the handlebar control assembly engageable to slow the vehicle.

18. The back-lit handlebar control assembly of claim 16, wherein the front housing and rear housing are separately tightened together.

19. A back-lit handlebar control assembly for vehicles steered by a handlebar, comprising:
   (a) a front control housing with control button passages therethrough;
   (b) back-lit control buttons with indicia thereon partially passing through the control button passages and extending from an electrical switch control assembly;
   c) a rear control housing joining the front control housing, enclosing the electrical switch assembly and securing the back-lit handlebar control assembly to the handlebar; and
   (d) an LED light on the switch assembly in contact with a light conducting element to illuminate the indicia on the control buttons for button visibility in low light conditions.

20. The back-lit handlebar control assembly of claim 19, further comprising a turn signal connected to the handlebar control assembly activated to indicate a turn by actuation of one of the buttons.

21. The back-lit handlebar control assembly of claim 19, further comprising a brake assembly attached to the rear control housing that is connected to the handlebar control assembly engageable to slow the vehicle.

22. The back-lit handlebar control assembly of claim 19, wherein the front housing and rear housing are separately tightened together.

* * * * *